United States Patent [19]

Dulck

[11] Patent Number: 5,507,454
[45] Date of Patent: Apr. 16, 1996

[54] SATELLITE AND METHOD TO PLACE THIS SATELLITE IN ORBIT BY GRAVITATIONAL ASSISTANCE

[75] Inventor: Jean F. Dulck, Toulouse, France

[73] Assignee: Centre National D'Etudes Spatiales, Toulouse, France

[21] Appl. No.: 646,426

[22] Filed: Jan. 28, 1991

[51] Int. Cl.$^6$ .............................. B64G 1/34; B64G 1/24
[52] U.S. Cl. ...................... 244/158 R; 244/164; 244/167
[58] Field of Search ........................ 364/434; 244/158 R, 244/161, 164, 167, 169, 171, 172, 173

[56] References Cited

U.S. PATENT DOCUMENTS

| D. 100,604 | 7/1981 | Crill et al. | 244/158 |
|---|---|---|---|
| 3,429,526 | 2/1969 | Genty | 244/169 |
| 3,995,801 | 12/1976 | Bond | 244/158 |
| 4,288,051 | 9/1981 | Göschel | 244/164 |

OTHER PUBLICATIONS

L. M. K. Boelter et al., Space Technology, 1959.
D. G. King-Hele: "An Introduction to Transfer Orbits Technical Note No.: Space 17" Sep. 1962, Royal Aircraft Establishment, Farnborough.

Inter-Electronique, vol. 27, No. 37, 24 Jan. 1972, Paris FR, pp. 14–15 A. Thiboumery: "Le Satellite Europeen HEOS–A2 avant sa mise en orbite".

*Primary Examiner*—Andres Kashnikow
*Assistant Examiner*—Virna Mojica
*Attorney, Agent, or Firm*—Nixon & Vanderhye

[57] ABSTRACT

Satellite and method for placing said satellite in orbit by lunar gravitational assistance.

After placing the satellite into standard orbit (01) within a quasi-equatorial plane, the satellite is transferred onto a circumlunar orbit (02) so that the satellite traverses the sphere of influence S1 of the moon. On leaving this sphere, the orbit (03) is inside a plane inclined with respect to the equatorial plane. The orbit is then connected to the definitive orbit (04).

2 Claims, 5 Drawing Sheets

SATELLITE AND METHOD TO PLACE THIS SATELLITE IN ORBIT BY GRAVITATIONAL ASSISTANCE

FIELD OF THE INVENTION

The object of the present invention concerns a satellite to be placed in orbit around the Earth on an orbit inclined with respect to the equatorial plane and a method to place such a satellite in orbit.

BACKGROUND OF THE INVENTION

The invention is more particularly applicable for use in spatial telecommunications applications.

Although the invention is applicable to any type of satellite and any type of orbit, it shall subsequently be considered for satellites with an elliptical orbit inclined with respect to the equatorial plane.

By way of example, this shall thus relate to satellites intended for a communication system denoted by the Applicant by the term "SYCOMORES", this abbreviation standing for a "System of Communication with Mobile Units Relayed by Satellites".

Such a communication system is described in the French patent No 88/02632 filed by the Applicant on 2 Mar. 1988.

FIG. 1 briefly summarizes the essential elements of this system.

A central station SC is situated at the center of a spherical triangle-shaped covering zone Z. Two geosynchronous satellites S-A and S-B have elliptical orbits with identical parameters. By way of explanation, these parameters may be the following:
apogee situated at about 50,543.4 km,
perigee situated at about 21,028.6 km,
meniscal axis of 42,164 km,
inclination of 63° 4,
perigee argument 270,
orbit excentricity 0.35.

Each satellite includes an antenna or antennae 11 and 12; each antenna is orientated towards the central station throughout the period when the satellite moves above the covering zone.

The central station includes one connection station and one control station.

FIG. 1 also shows a mobile unit M (which of course is situated inside the zone Z but which is shown above the latter for the sake of more clarity). This mobile unit is equipped with an antenna 14 whose axis continuously points towards the zenith.

In order to station such satellites, a large number of strategies are possible, but only one shall be described with reference to FIG. 2. This stationing uses the ARIANE IV rocket and requires three pulses. At the time of launching, the satellite is accompanied by an ordinary geostationary satellite. The two satellites are placed on the standard transfer orbit of the ARIANE IV rocket, this orbit being situated within a quasi-equatorial plane (inclination of 7°) with a perigee at 200 km, an apogee at 35,975 km and a perigee argument of 178° (orbit marked OST on FIG. 2).

Close to the perigee, a satellite rocket is ignited for a first pulse suitable for raising the apogee to 98,000 km, the orbit remaining within the same plane (orbit 01). This pulse may be broken down into two or three pulses.

Close to the apogee of the orbit 01, a new pulse is sent to the satellite to change the plane of its orbit. The inclination of this plane is close to that of the plane of the definitive orbit (namely 63° 4). This thrust is the largest and may be broken down into two or three thrusts. The orbit then becomes 02.

Finally, at an appropriate point of this orbit, a third thrust is sent to the satellite so as to provide it with a definitive orbit.

If this strategy is satisfactory in certain respects, it nevertheless does constitute a drawback. In fact, it requires that the orbital plane be tilted when passing from the orbit 01 to the orbit 02, this resulting in a considerable consumption of propellant. It would be preferable to be able to reduce this consumption so as to increase the mass of the carrying capacity.

SUMMARY OF THE INVENTION

The object of the present invention is to overcome this drawback. To this end, it proposes a satellite and transfer method so that the tilting of the orbital plane is effected without consuming propellant.

So as to attain this goal, the invention recommends the exploitation of an effect known in itself but applied in this instance for other purposes. This effect is gravitational assistance. Already used for interplanetary probes, it is obtained by having the planet flown over by the probe. The mass and speed of the planet flown over have the effect of modifying the direction of the speed vector of the probe (speed with respect to the planet), the norm of this speed remaining roughly constant.

The consequence of this gravitational effect is that the orientation and norm of the relative speed vector are modified between arrival close to the planet and start up. This then results in tilting of the plane of the orbit.

This effect, known as gravitational assistance, has been used to place probes on heliocentric orbits in planes outside the plane of the ecliptic plane without it being necessary to carry out a maneuver without consuming a large quantity of propellant.

According to the invention, this technique is applied and suitable for the case of lunar gravitational assistance. The system used is no longer heliocentric (sun, planet, probe) but geocentric (earth, moon, satellite).

More specifically, the object of the invention is to provide a satellite to be placed in orbit around the Earth on an elliptic orbit inclined with respect to the equatorial plane, wherein it includes:

telecommunications means with a command and control station situated on the ground, means to send to the satellite, previously placed on a standard transfer orbit within a quasi-equatorial plane, a first thrust exerted in this plane and suitable for transferring the satellite onto a circumlunar orbit situated within the same quasi-equatorial plane, means for stabilizing three axes of the attitude of the satellite, means to adjust the speed of the satellite on its circumlunar orbit so that it penetrates into the sphere of influence of the moon and leaves it again, the satellite having its speed vector change direction naturally inside this sphere, the orbit of the satellite thus passing into a new plane which is inclined with respect to the quasi-equatorial plane, means to send the satellite a new thrust in this new plane so as to transfer it onto the desired final elliptic orbit.

The object of the present invention is also to provide a method to place such a satellite in orbit. According to this method:

the satellite is placed on a standard transfer orbit situated in a quasi-equatorial plane, a thrust is exerted in this plane, this thrust being suitable for transferring the satellite onto a circumlunar orbit situated in the same quasi-equatorial plane, the attitude of the satellite is stabilized along three axes, the speed of the satellite is adjusted as regards its circumlunar orbit so that it penetrates into the sphere of influence of the moon and comes out it again, the satellite having its speed vector naturally change direction inside this sphere, the orbit of the satellite thus moving into a new plane inclined with respect to the quasi-equatorial plane, a new thrust is sent to the satellite in this new plane so as to transfer it onto the desired final orbit.

By means of the invention, the sum of the thrusts required is reduced. The speed deviations are in fact about 690 m/s for transfer onto the circumlunar orbit and 1360 m/s for connection to the final orbit, namely in all about 2050 m/s compared with the 2350 m/s with the strategy illustrated on FIG. 2 (and compared with 700 m/s in the case of stationing a geostationary satellite). All things being equal, the permitted increase for the weight of the carrying capacity is 60%. The used carrying capacity currently stands at 120 kg requiring an ergol consumption equal to 2350 m/s compared with a carrying capacity of 200 kg with the present invention.

The use of lunar gravitational assistance requires that navigation problems concerning the circumlunar orbit be resolved. These problems can be overcome by using a pseudo-inertial "three axes" stabilization system disposed around a North/South axis, this system using stellar sensors. The parallax effects then become negligible.

As emphasized above, the invention may be applied for the transfer of a satellite inside any plane from a standard injection orbit. It also allows for secondary missions when flying over the moon at strictly much smaller distances than the radius of the sphere of influence (equal to 10.34 times the terrestial radius, namely about 65,950 km).

BRIEF DESCRIPTION OF THE DRAWINGS

The characteristics and advantages of the invention shall appear more readily from a reading of the following description of embodiment examples, given by way of illustration and being in no way restrictive, with reference to the accompanying drawings on which.

DETAILED DESCRIPTION OF THE PREFERRED EMBODIMENTS

Figure 1:
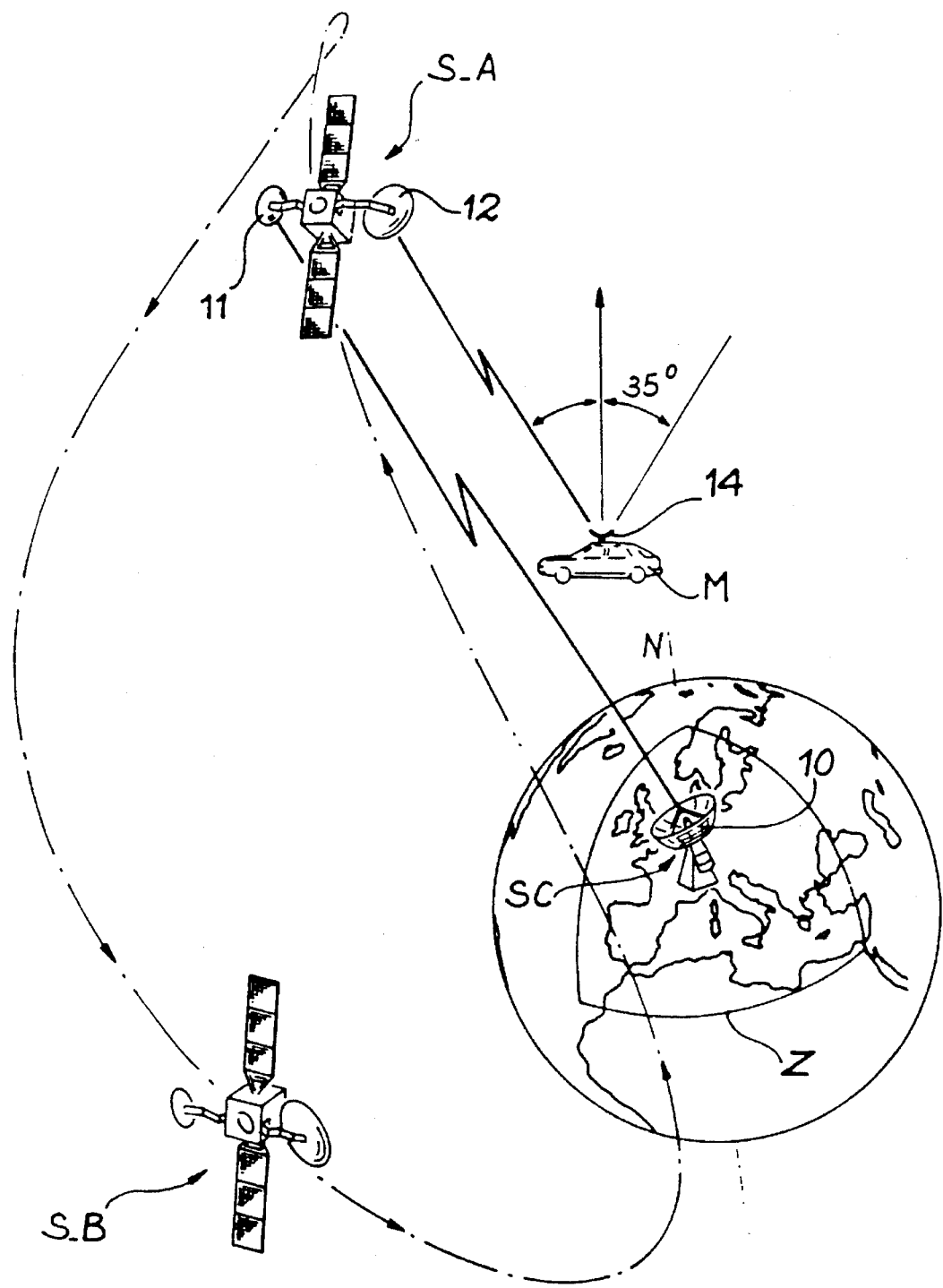
FIG. 1, already described, shows a satellite communication system.
Figure 2:
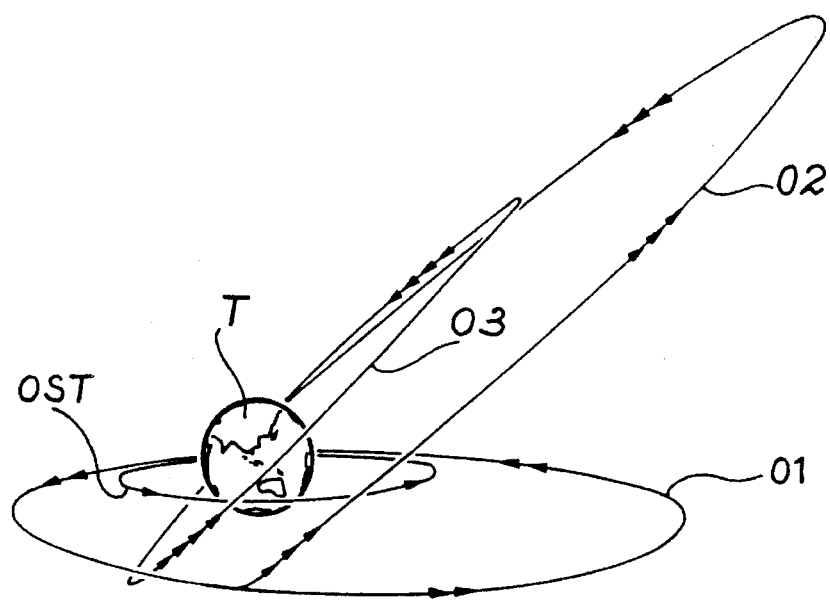
FIG. 2, already described, shows a transfer strategy according to the prior art, FIG. 3 diagrammatically shows the various orbiting phases according to the invention.
Figure 3:
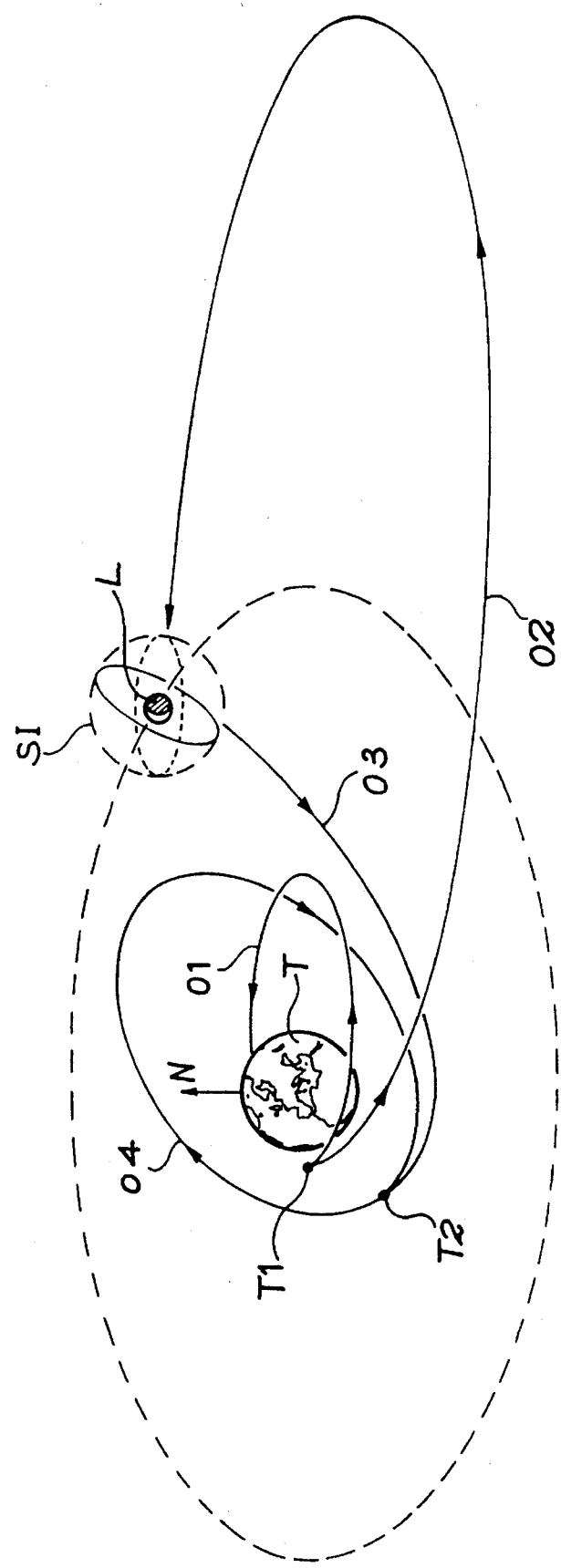

FIG. 3 diagrammatically shows the lunar gravitational assistance transfer principle of the invention. The satellite is firstly transferred onto a standard orbit 01 situated inside a quasi-equatorial plane, which, in practice, is the orbit OST of FIG. 2 (still known as a GTO orbit ("Geostationary Transfer Orbit")); at T1, the satellite is transferred onto a circumlunar orbit 02, still situated in the quasi-equatorial plane. In practice, an extremely elliptic orbit shall be selected whose major axis may be close to twice the Earth/Moon distance, namely about 768,800 km. The satellite penetrates into the sphere of influence SI of the moon and leaves this sphere on a trajectory 03 whose plane is highly inclined with respect to the equatorial plane. At T2, the satellite is injected onto the definitive orbit 04 inside the same plane as the orbit 03.

Figure 4:
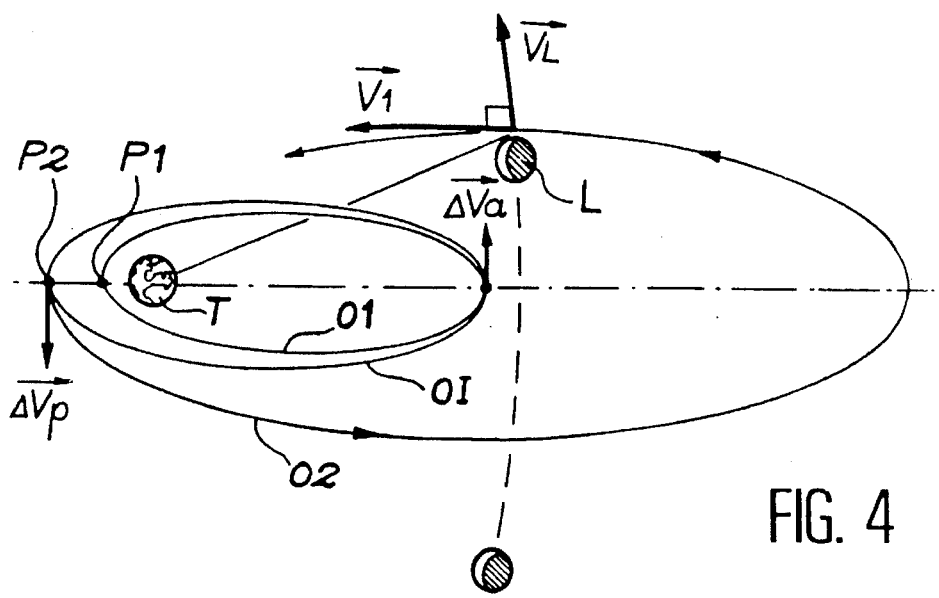
FIG. 4 shows the various speeds and thrusts used.

FIG. 4 specifies to a slight extent the various parameters used in a particular implementation mode.

This figure shows three orbits: the orbit 01, namely the conventional geostationary transfer orbit, an intermediate orbit 0I, and the circumlunar orbit 02.

The aim of the pulse $\Delta Va$ is to record the altitude of the perigee of the transfer orbit GTO so as to have it move from 200 to 450 km.

The purpose of the pulse $\Delta Vp$ is to move onto the circumlunar orbit with a half-major axis equal to the Earth/Moon distance, namely 384,402 km.

Having regard to the extreme excentricity of the circumlunar orbit, when the satellite penetrates into the sphere of influence of the Moon, or, if desired, "cuts" the orbit of the Moon, its speed with respect to the Earth V1 is virtually the same as that of the Moon VL with respect to the Earth. In addition, the two speed vectors are virtually perpendicular.

The main characteristics of the three orbits 01, 0I and 02 are given in the following table where a denotes the half-major axis, e the eccentricity, zp the altitude of the perigee, za the altitude of the apogee, Va the speed of the apogee and Vp the speed of the perigee.

|    | Orbit 01    | Orbit 0I    | Orbit 02      |
|----|-------------|-------------|---------------|
| a  | 24,465.5 km | 24,590.5 km | 384,402 km    |
| e  | 0.731       | 0.722       | 0.982         |
| zp | 200 km      | 450 km      | 450 km        |
| za | 35,975 km   | 35,975 km   | 761,884.76 km |
| Va | 1591.18 m/s | 1617.67 m/s | 97.04 m/s     |
| Vp |             | 10,020.26 m/s | 10,685.41 m/s |

The speed deviation at the apogee between the orbits 01 and 0I is thus $\Delta Va=26$ m/s and the speed deviation at the perigee between the orbits 0I and 02 is $\Delta Vp=665.15$ m/s, namely in all:

$$\Delta V1 = \Delta Va + \Delta Vp = 691.65 \; m/s$$

This is the one corresponding to the value of 690 m/s mentioned earlier for the thrust $\Delta V1$ which has been broken down into two thrusts, one for the apogee and the other for the perigee.

Figure 5:
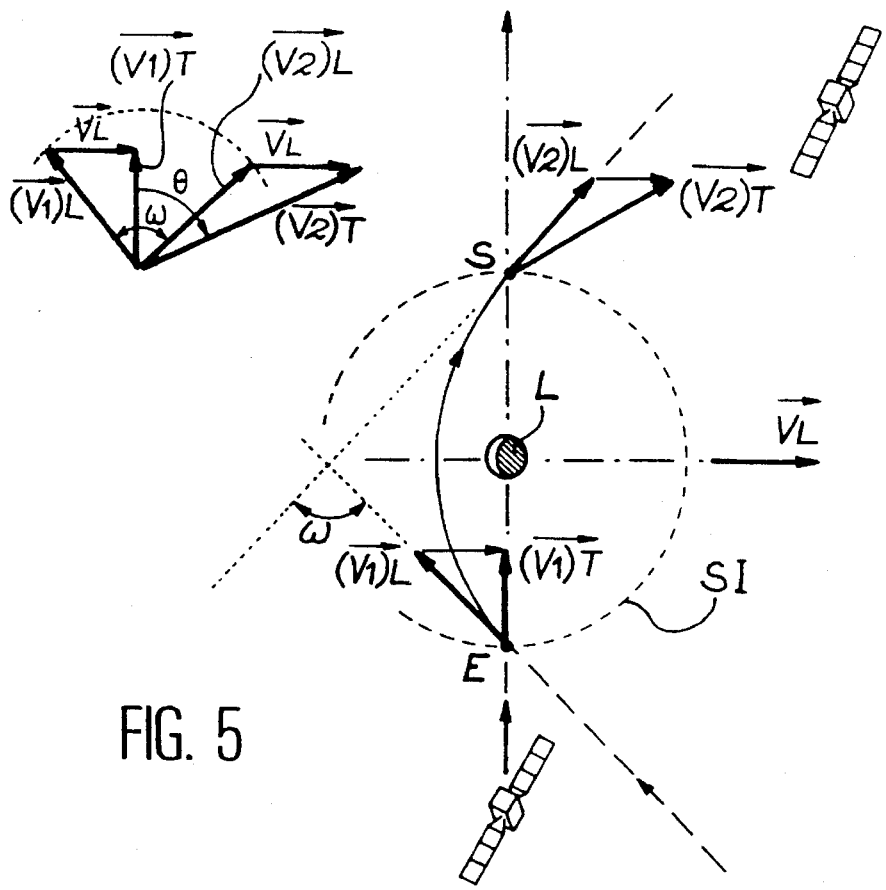
FIG. 5 shows the modification of the speed vector at the crossing point of the sphere of influence of the Moon.

FIG. 5 shows the modification of the speed vector at the crossing point of the sphere of influence of the Moon.

The Moon is denoted by the letter L. Its speed with respect to the Earth is noted $\overrightarrow{VL}$ and is assumed to be directed from left to right. The sphere of influence is noted SI.

The satellite penetrates into the sphere of influence at the point E with a speed $(\overrightarrow{V1})T$ with respect to the Earth. In a mark linked to the Moon, this speed needs to be composed with the speed $\overrightarrow{VL}$ so as to give the vector $(\overrightarrow{V1})L$.

By traversing the sphere of influence, the vector $(\overrightarrow{V1})L$ does not change the module but its direction tilts by an angle $\omega$.

At the outlet S of the sphere of influence, the speed vector of the satellite with respect to the Moon has become $\overrightarrow{(V_2)}L$. It needs to be composed with the speed of the Moon VL so as to obtain the speed vector $\overrightarrow{(V_2)}T$ with respect to the Earth.

The speed vector of the satellite with respect to the Earth has thus tilted from $\overrightarrow{(V_1)}T$ to $\overrightarrow{(V_2)}T$, namely by an angle $\Theta$.

Figure 6:
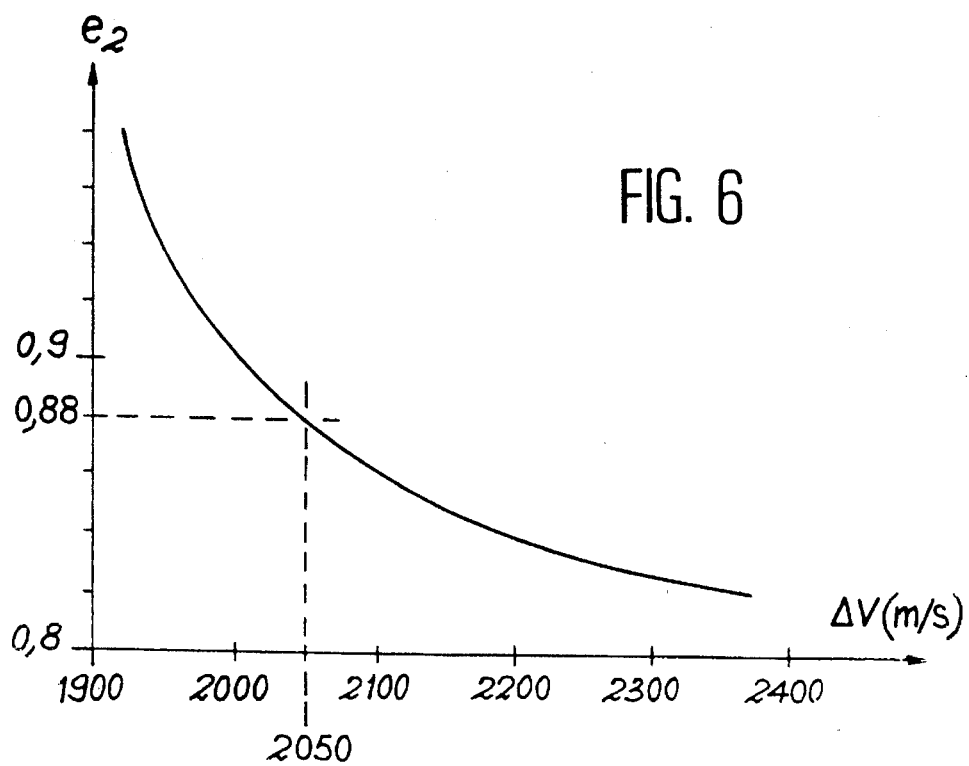
FIG. 6 shows the variations of excentricity as a function of the transfer cost.
Figure 7:
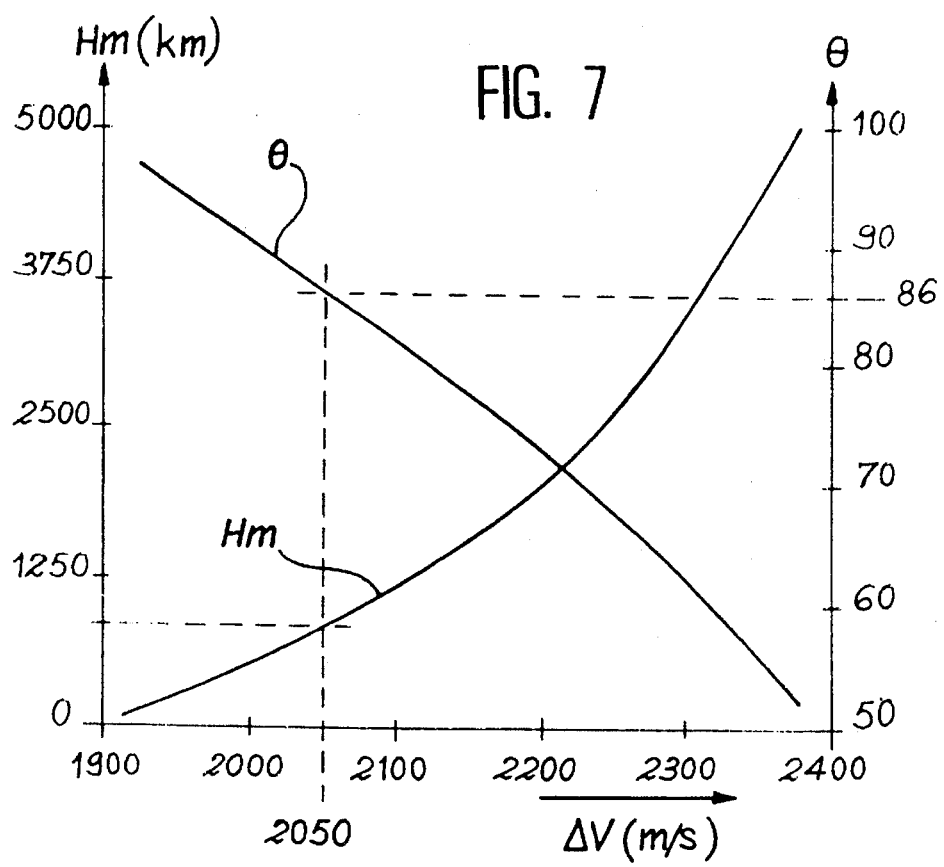
FIG. 7 is a chart corresponding to the crossing point of the sphere of influence of the Moon.

The calculations carried out by the Inventor make it possible to plot two sets of curves shown on FIGS. 6 and 7:

FIG. 6 shows the relation between the excentricity e of the terrestrial orbit after leaving the sphere of influence as a function of the total transfer consumption $\Delta V$ in m/s, e equalling 0.88 and $\Delta V$ having 2050 m/s.

FIG. 7 shows a chart connecting the minimum altitude for flying over the Moon Hm expressed in km (ordinates on the left), the gravitational assistance transfer consumption $\Delta V$ (in abscissae expressed in m/s) and the deviation $\Theta$ close to the Moon (ordinates on the right) expressed in degrees.

For $\Delta V = 2050$ m/s, the minimum altitude is Hm=816 km and the angle of deviation $\Theta = 86°$. The tilting of the orbital plane is then 60°.

Figure 8:
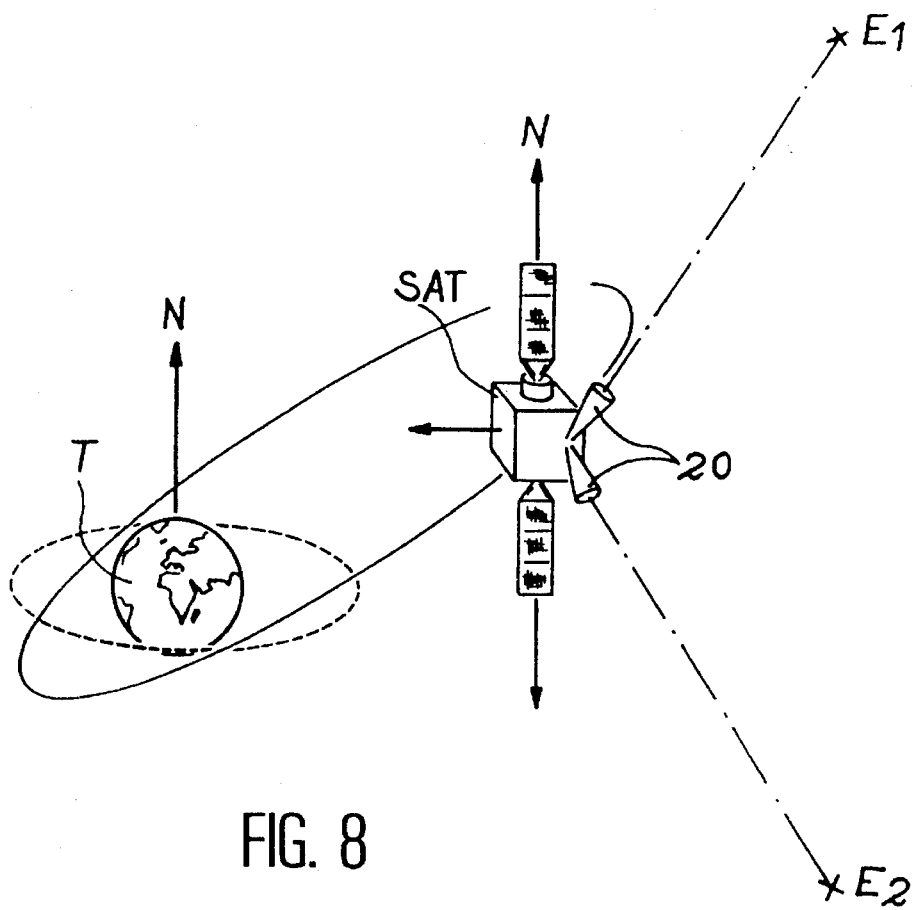
FIG. 8 shows the attitude of the satellite on its final trajectory.

Finally, FIG. 8 shows the attitude of the satellite on its final trajectory. The satellite is orientated along three axes, the pitch axis being orientated North/South; apart from other factors, the satellite uses a double stellar sensor 20.

Of course, the station on the ground controls and commands all these operations with the aid of calculation, telecommunications means, etc., these means not being described here as these are well-known by experts in this field.

What is claimed is:

1. A satellite intended to be placed in orbit around the Earth on an final elliptic orbit inclined with respect to the equatorial plane of Earth wherein said satellite has initially been placed in a standard transfer orbit situated inside a quasi-equatorial plane, wherein it includes:

means for telecommunications with a command and control station situated on the ground, means for transferring the satellite onto a circumlunar orbit situated in the same quasi-equatorial plane, means for stabilizing three axes of the attitude of the satellite, means for adjusting the speed of the satellite on said circumlunar orbit so that it penetrates into and out of a sphere of influence of the Moon, said satellite having its speed vector naturally change direction in this sphere, said sphere and the speed vector of said satellite upon penetrating said sphere comprising a means for changing the orbit of the satellite into a new plane which is inclined with respect to said quasi-equatorial plane, means for changing the velocity vector in said new plane so as to transfer said satellite into said final elliptic Earth orbit.

2. A satellite according to claim 1, wherein the means for changing, said velocity, vector and said means for transferring comprise means for providing thrusts, said thrusts are several elementary thrusts.

\* \* \* \* \*

UNITED STATES PATENT AND TRADEMARK OFFICE

CERTIFICATE OF CORRECTION

PATENT NO.    : 5,507,454
DATED         : April 16, 1996
INVENTOR(S)   : DULCK

It is certified that error appears in the above-identified patent and that said letters patent is hereby corrected as shown below:

Column 6 claim should read:

1. Method for placing the satellite in a desired final orbit comprising the steps of:

placing the satellite on a standard transfer orbit situated in a quasi-equatorial plane,
   exerting a thrust in this plane sufficient to transfer the satellite onto a circumlunar orbit situated inside the same quasi-equatorial plane,
   stabilizing the attitude of the satellite along three axes,
   adjusting the speed of the satellite on said circumlunar orbit so that said satellite penetrates into and out of a sphere of influence of the Moon, thereby changing the orbit of the satellite into a new plane inclined with respect to said quasi-equatorial plane,
   changing the velocity vector of said satellite in said new plane so as to transfer it onto said desired final orbit.

2. Method according to claim 1, wherein said exerting and sending steps comprise thrusts which are broken down into several elementary thrusts.

Signed and Sealed this

Twenty-fifth Day of May, 1999

Attest:

Q. TODD DICKINSON

*Attesting Officer*          *Acting Commissioner of Patents and Trademarks*

UNITED STATES PATENT AND TRADEMARK OFFICE
CERTIFICATE OF CORRECTION

PATENT NO. : 5,507,454
DATED : April 16, 1996
INVENTOR(S) : DULCK

It is certified that error appears in the above-identified patent and that said Letters Patent is hereby corrected as shown below:

What is claimed is:

1. Method for placing the satellite in a desired final orbit comprising the steps of:

placing the satellite on a standard transfer orbit situated in a quasi-equatorial plane,
    exerting a thrust in this plane sufficient to transfer the satellite onto a circumlunar orbit situated inside the same quasi-equatorial plane,
    stabilizing the attitude of the satellite along three axes,
    adjusting the speed of the satellite on said circumlunar orbit so that said satellite penetrates into and out of a sphere of influence of the Moon, thereby changing the orbit of the satellite into a new plane inclined with respect to said quasi-equatorial plane,
    changing the velocity vector of said satellite in said new plane so as to transfer it onto said desired final orbit.

2. Method according to claim 1, wherein said exerting and sending steps comprise thrusts which are broken down into several elementary thrusts.

Signed and Sealed this

Fifteenth Day of June, 1999

*Attest:*

Q. TODD DICKINSON

*Attesting Officer*     *Acting Commissioner of Patents and Trademarks*